United States Patent
Tidwell

(10) Patent No.: US 7,178,925 B1
(45) Date of Patent: Feb. 20, 2007

(54) RETRACTABLE SIDE VIEW MIRROR FOR A TRACTOR TRAILER

(76) Inventor: Donald R. Tidwell, 18605 Oshawa Dr., Hudson, FL (US) 34667

( * ) Notice: Subject to any disclaimer, the term of this patent is extended or adjusted under 35 U.S.C. 154(b) by 0 days.

(21) Appl. No.: 11/165,805

(22) Filed: Jun. 24, 2005

Related U.S. Application Data

(60) Provisional application No. 60/582,843, filed on Jun. 25, 2004.

(51) Int. Cl.
G02B 5/08 (2006.01)
G02B 7/182 (2006.01)
B60R 1/06 (2006.01)

(52) U.S. Cl. .................. 359/841; 359/877; 359/881; 248/480; 248/484

(58) Field of Classification Search .............. 359/841, 359/872, 877, 881; 248/480, 484
See application file for complete search history.

(56) References Cited

U.S. PATENT DOCUMENTS

| | | | | |
|---|---|---|---|---|
| 2,241,866 A | * | 5/1941 | Needham | 359/841 |
| 2,839,965 A | * | 6/1958 | Budreck | 248/480 |
| 3,107,077 A | * | 10/1963 | Lassa | 248/478 |
| 3,640,608 A | * | 2/1972 | McKee et al. | 359/843 |
| 3,671,005 A | * | 6/1972 | Schultz | 248/480 |
| 3,937,563 A | * | 2/1976 | Frabe | 359/841 |
| 4,558,930 A | * | 12/1985 | Deedreek | 359/841 |
| 6,276,805 B1 | * | 8/2001 | Home et al. | 359/841 |
| 6,325,518 B1 | * | 12/2001 | Whitehead et al. | 359/841 |
| 6,394,616 B1 | * | 5/2002 | Foote et al. | 359/841 |
| 6,439,730 B1 | * | 8/2002 | Foote et al. | 359/877 |
| 6,755,543 B1 | * | 6/2004 | Foote et al. | 359/877 |
| 6,877,868 B2 | * | 4/2005 | Olijnyk et al. | 359/841 |

FOREIGN PATENT DOCUMENTS

| | | | |
|---|---|---|---|
| EP | 0753430 A2 | * | 1/1997 |
| WO | WO 03/037681 A1 | * | 5/2003 |
| WO | WO 03/046937 A1 | * | 6/2003 |

* cited by examiner

Primary Examiner—Ricky D. Shafer
(74) Attorney, Agent, or Firm—Kenneth L Tolar

(57) ABSTRACT

A retractable mirror assembly for a tractor trailer includes a base component having a pair of arms and a motorized hydraulic cylinder mounted on the upper surface thereof. The arms are pivotally attached at a lower end to the base component and at an upper end to a mirror. The hydraulic cylinder includes an upper distal end that is pivotally attached to an outer edge of the mirror. A control panel within the vehicle passenger compartment activates the motor allowing a driver to automatically extend and retract the mirror between an operable and inoperable position.

3 Claims, 1 Drawing Sheet

RETRACTABLE SIDE VIEW MIRROR FOR A TRACTOR TRAILER

CROSS REFERENCE TO RELATED APPLICATIONS

This application is entitled to the benefit of provisional application No. 60/582,843 filed on Jun. 25, 2004.

BACKGROUND OF THE INVENTION

The present invention relates to side view mirrors that can be automatically retracted to assist a driver in maneuvering a vehicle within confined spaces.

DESCRIPTION OF THE PRIOR ART

Due to their enormous size, tractor trailers are often equipped with fender-mounted side view mirrors that extend outwardly at a predetermined angle allowing the driver to see far behind the vehicle. However, because such mirrors protrude significantly, they are easily damaged and often prevent the driver from maneuvering the vehicle within confined spaces. Accordingly, many drivers will not install them thereby restricting their rear field of view. The present invention addresses this problem by providing a retractable side view mirror assembly allowing the vehicle to be safely operated within confined spaces.

SUMMARY OF THE INVENTION

The present invention relates to a retractable side view mirror assembly for a vehicle. The device comprises a base component having an upper surface and a lower surface. Mounted on the upper surface is a motor operated hydraulic cylinder. The cylinder includes an upper distal end that is pivotally attached to an outer rim of a mirror. The device also includes a pair of support arms each having a lower end pivotally attached to the base component. The upper end of each arm is pivotally attached to the mirror. The reversible motor that operates the hydraulic cylinder is electrically connected to the vehicle electrical system and is activated with a control panel positioned within the vehicle passenger compartment. Accordingly, by manipulating a switch on the control panel, a user can activate the motor to automatically extend the mirror outwardly allowing the driver to easily see far behind the vehicle. When the mirrors are not needed or the vehicle is being maneuvered within confined spaces where the mirrors are susceptible to damage, the driver can easily retract the mirror assembly to an inoperable position.

It is therefore an object of the present invention to provide a retractable side view mirror assembly for a tractor trailer that can be automatically extended and retracted.

It is another object of the present invention to provide a retractable mirror assembly for a tractor trailer that eliminates the problems associated with the use of conventional fender-mounted side view mirrors.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
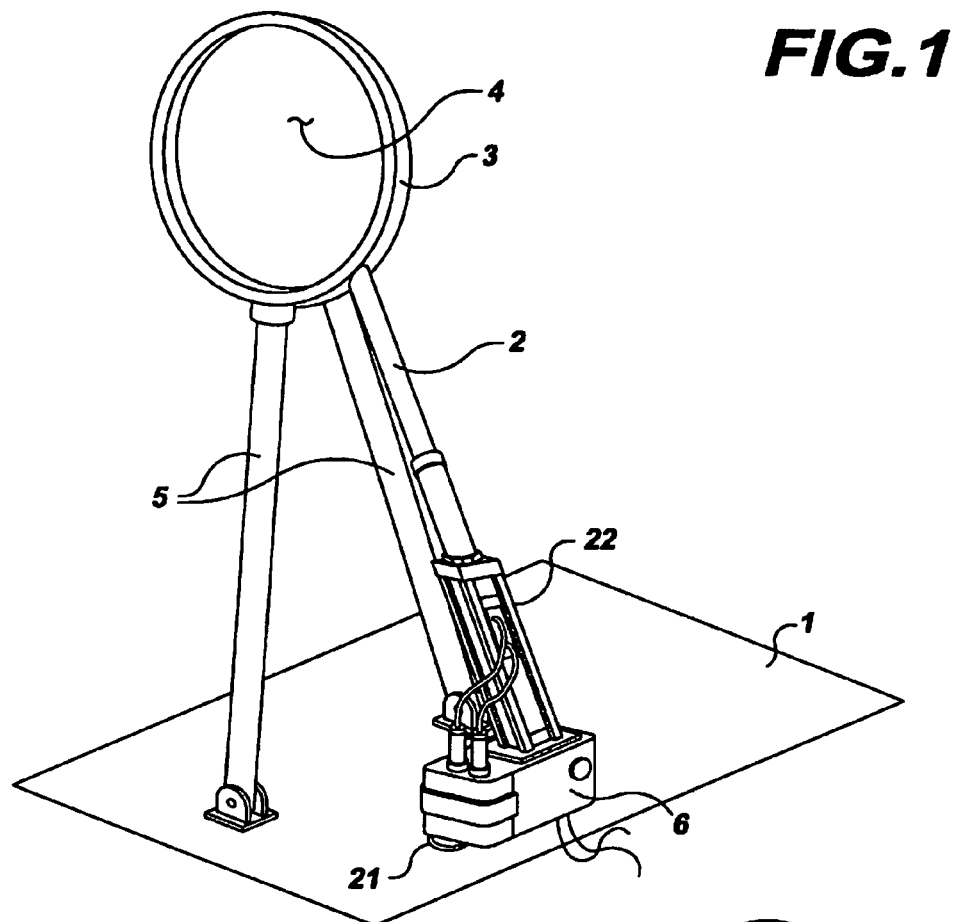
FIG. 1 is a perspective view of the mirror assembly in the extended position.
Figure 2:
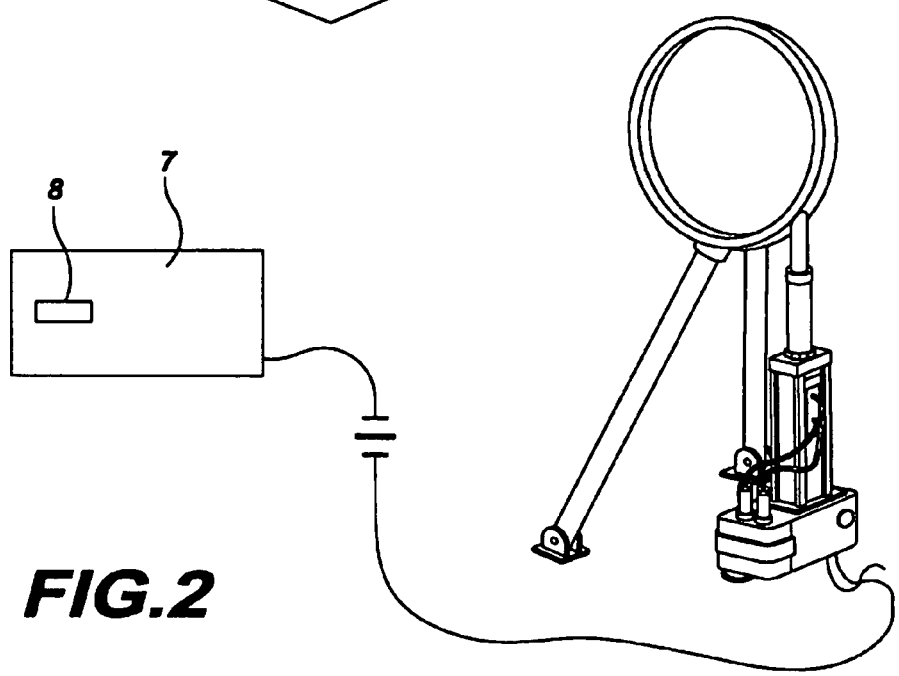
FIG. 2 is a perspective view of the mirror assembly in a retracted position.

The present invention relates to a retractable side view mirror assembly for a vehicle such as a tractor trailer. The device comprises a base component 1 having an upper surface and a lower surface. Extending outwardly from the base component are mounting tabs 21 with apertures for receiving conventional fasteners to secure the base component to a vehicle fender or another convenient location. Mounted on the upper surface of the base component is a motor operated hydraulic cylinder 22 having an upper distal end 2 that is pivotally attached to an outer rim 3 of a mirror 4. The lower end of the cylinder is also pivotal relative to the base component. The reversible motor 6 that operates the hydraulic cylinder is electrically connected to the vehicle electrical system and is activated with a control panel 7 positioned within the vehicle passenger compartment.

The device also includes a pair of spaced support arms 5 each having a lower end pivotally attached to the upper surface of the base component. The upper end of one arm is pivotally attached to the rear surface of the mirror while the upper end of the other arm is pivotally attached to the mirror outer rim.

Preferably, a mirror assembly as described above is secured to each of two front fenders of the vehicle so as to be readily observable by the vehicle driver. Accordingly, by actuating a reversible switch 8 on the control panel, a user can automatically extend the mirror outwardly allowing the driver to easily see behind the vehicle. When the mirrors are not needed or the vehicle is being maneuvered within confined spaces where the mirrors may be susceptible to damage, the driver can easily retract the mirror assembly to an inoperable position by actuating the switch so as to reverse the motor.

The above described device is not limited to the exact details of construction and enumeration of parts provided herein. For example, though the device is depicted and described as being designed primarily for use with a tractor trailer, it can be used with various oversized vehicles. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A retractable side view mirror assembly for a vehicle comprising:
    a base component having an upper surface and a lower surface;
    means for securing the base component to a vehicle;
    a telescoping cylinder pivotally mounted on the upper surface of the base component, said cylinder having an upper distal end;
    at least one support arm having a lower end pivotally attached to the upper surface of the base component and an upper end;
    a mirror pivotally attached to the upper end of said support arm and the upper end of said cylinder;

means for automatically extending and retracting said cylinder to move said mirror outwardly and inwardly relative to the vehicle.

2. The retractable side view mirror assembly for a vehicle according to claim 1 wherein said means for automatically extending and retracting said cylinder to move said mirror outwardly and inwardly relative to a vehicle comprises a reversible motor electrically connected to a vehicle electrical system.

3. The retractable side view mirror assembly for a vehicle according to claim 2 wherein said motor is activated with a control panel positioned within a vehicle passenger compartment, said control panel having a two way switch thereon for operating said motor in either of two directions to selectively extend and retract said cylinder.

\* \* \* \* \*